Figure 7:
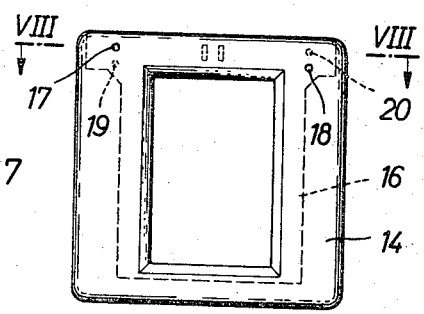

Sept. 19, 1967     P. FLORJANCIC ET AL     3,341,960
TRANSPARENCY FRAME
Filed May 14, 1964                             3 Sheets-Sheet 1
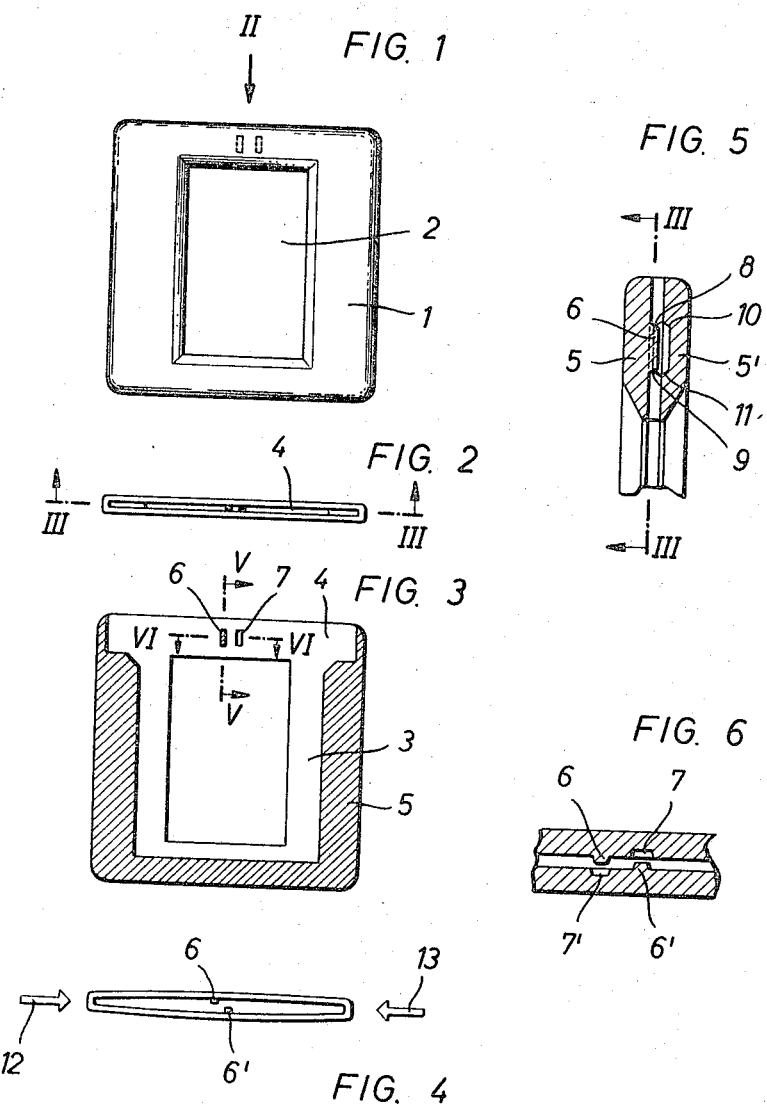
Inventors
Peter Florjancic
Peter Mundt
By Stevens, Davis, Miller & Mosher
Attorneys Sept. 19, 1967  P. FLORJANCIC ET AL  3,341,960
TRANSPARENCY FRAME Filed May 14, 1964  3 Sheets-Sheet 2

Inventors
Peter Florjancic
Peter Mundt
By Stevens, Davis, Miller & Mosher
Attorneys United States Patent Office 3,341,960
Patented Sept. 19, 1967

3,341,960
TRANSPARENCY FRAME
Peter Florjancic, Villach, Austria, and Peter Mundt, Garmisch-Partenkirchen, Germany, assignors to Geimuplast Peter Mundt KG., Garmisch-Partenkirchen, Germany
Filed May 14, 1964, Ser. No. 367,528
Claims priority, application Germany, May 21, 1963, G 37,799; July 9, 1963, G 38,133
21 Claims. (Cl. 40—152)

This invention relates to a one-part, preferably glassless transparency frame, which consists of plastics material and has a lateral receiving slot.

A known one-part transparency frame, which is formed with a lateral receiving slot and consists preferably of plastics material, without glass, is provided adjacent to the receiving slot with at least, and preferably, one raised portion, across which the piece of film can be pushed only with deformation. The raised portion or portions are provided in the slot and laterally spaced from the area in which the actual picture area of the film slides, in order to avoid a scratching of this picture area. Practice has shown, however, that the piece of film cannot be introduced through the receiving slot without risk of a scratching of the picture area during the insertion of pictures into a series of frames by means of a machine. The known frame is also said to have the advantage that it can be injection-molded from plastics material in one operation. This hope has not been fulfilled in practice, however, because the sheet core for shaping the pocket for receiving the piece of film cannot be pulled out in view of the steep inside slope of the raised portion.

It is an object of the invention to provide a transparency frame which avoids the above-mentioned disadvantages so that it can be injection-molded in practice in one operation from plastics material and is suitable for mounting transparencies in large quantities by the commercially available mounting machines, which require only a slight alteration for this purpose.

This object is accomplished by the invention in a frame of the type described first hereinbefore in that according to the invention the two halves of the frame are designed to be spread apart adjacent to the receiving slot. In one embodiment of the invention, at least one half of the frame has adjacent to the receiving slot, but outside the slideway for the piece of film, at least one through bore, which forms a passage for a spreading mandrel to be applied against the inside surface of the other half of the frame. For this reason it is sufficient to provide the commercially available mounting machines with one or more spreading mandrels, which enter the above-mentioned bore or bores and upon a further introduction into the frame, which is held in position on the machine, engage the inside surface of the other half of the frame to widen the receiving slot. This suggestion of the invention may be carried out in that the receiving pocket for the piece of film is wider adjacent to the receiving slot and at least one half of the frame has, adjacent to the receiving slot, two through bores, each of which forms a passage for a spreading mandrel engaging the inside surface of the other half of the frame, which bores are arranged so that the inserted spreading mandrels serve as lateral guide pins for the piece of film to be introduced. This affords the further advantage that the spreading mandrels locate the transparency frame in the mounting machine in such a manner that the piece of film can be introduced without trouble into the receiving slot.

In another embodiment of the invention, the upper portion of the receiving slot extends throughout the width of the frame, and the receiving slot is formed with two webs, which extend at right angles to the length of the receiving slot and are spaced from the lateral ends of the slot. The receiving slot of such a transparency frame can be widened by exerting pressure in opposite directions on the end portions of the two halves of the frame. The webs extending at right angles to the slot will then provide for a lever action so that the receiving slot is caused to gape in arcuate shape.

In another embodiment of the invention, the receiving pocket is larger in width adjacent to the receiving slot. By this design, the spreading of the two halves of the frame is much facilitated so that a lateral pressure on the frame is sufficient. The larger width of the receiving pocket adjacent to the receiving slot affords the additional advantage that the piece of film can easily be introduced, even by a machine, in spite of the constriction of the receiving pocket due to the spreading.

It will be understood that the various embodiments may be combined with each other within the scope of the present invention. The embodiment in which each half of the frame is formed with through bores has a great advantage also from the injection-molding aspect. During the injection-molding operation that plate which carries the core for shaping the window may be provided with pins, which extend into the through bores of each half of the frame. When the injection-molding operation has been completed, it is sufficient to open this plate to a slight extent so that the pins are still within the bores of the halves of the frame. As a result, the frame molding is held in a spread condition and the sheet core for shaping the receiving pocket for the piece of film can readily be pulled because the frame molding is held at its bores by the pins of the plate formed with the window core.

In a development of the invention, the receiving slot opens into a sacklike or tubular receiving pocket for the piece of film. In transparency frames having a tubular receiving pocket for the piece of film, the two halves of the frame can be more effectively and easily spread apart adjacent to the receiving slot. Particularly these frames according to the invention can be provided with a transparency in the mounting machine by simple lateral pressure. Another advantage of a frame having a tubular receiving pocket resides in that the transparency can be inserted from both sides.

To prevent a falling of the transparency out of the frame, the invention teaches to provide adjacent to the receiving slot at least one half of the frame with at least one limiting cam for the inserted piece of film, which cam has inclined run-up surfaces on both sides in the direction in which the piece of film is inserted, and to provide the opposite inside surface of the other half of the frame with at least one correspondingly shaped groove. Each limiting cam is preferably only somewhat higher and each groove only somewhat deeper than one half the width of the receiving slot. Such a design is entirely sufficient for protecting the film picture and affords the advantage that the sheet core for shaping the receiving pocket can be pulled more easily.

Adjacent to that receiving slot which is not used for the insertion of the piece of film, a frame formed with a tubular receiving pocket has at least centrally another through bore forming a passage for a limiting mandrel. This design of the frame prevents a loss of the inserted piece of film from the frame during mounting, when the frame may arcuately gape throughout its extent.

According to the invention, a sacklike receiving pocket has associated with it at least one limiting cam and one groove adjacent to both receiving slots. This prevents a falling of the mounted piece of film from the sacklike receiving pocket on either side.

Another peculiarity of frames having a sacklike receiving pocket resides in that lateral guiding and limiting cams for the piece of film are provided according to the invention in the tubular receiving pocket. This ensures that the picture area of the piece of film will be in registry with the picture window of the two halves of the frame. A conical design of the guiding and limiting cams and of the mating grooves ensures that the sheet core which shapes these elements during the injection-molding operation can be pulled without difficulty.

In a transparency frame of the type described hereinbefore, the invention resides further in that the transparency is locked against slipping out of the receiving slot by a deformed portion of at least one half of the frame in a preferably central portion of the receiving slot. The deformation of the frame is effected when the transparency has been inserted through the slot into the frame. The commercially available machines for mounting transparencies in frames can be provided with an additional deforming punch without difficulty. The design of the transparency frame according to the invention has the advantage over the previously described embodiments that a smooth sheet core may be used for shaping the receiving pocket of the transparency frame.

According to an advantageous development of the invention, at least one half of the frame has on its outside surface a dead-ended hole, the bottom of which is welded to the opposite wall portion of the other half of the frame. The homogeneous bond provided according to the invention between the two halves of the frame has the advantage that the receiving slot of the transparency frame cannot be inadvertently spread after making-up. Such inadvertent spreading might result in a loss of the transparency. Each of the halves of the frame may preferably be provided with a dead-ended hole. The welding is again effected on the mounting machine by means of one or two heated welding punches.

If the transparency should be replaceably mounted in the frame, the invention teaches to deform the bottom of the dead-ended hole into engagement with the opposite wall portion of the other half of the frame. This deformation may be effected on the mounting machine by warm or cold punches.

The invention may alternatively be carried out in that one half of the frame is provided on its outside surface with at least one dead-ended hole and the other half of the frame is provided in the opposite portion with a bore, into which the bottom of the dead-ended bore is forced. A firm connection between the two halves of the frame is not required in this case because it is sufficient to form a lock for the transparency in the receiving slot. The drawing of the bottom of the dead-ended bore into the opposite bore of the other half of the frame is also effected on the making-up machine.

Various embodiments of the invention will be explained by way of example in the following description with reference to the drawing.

Figure 11:
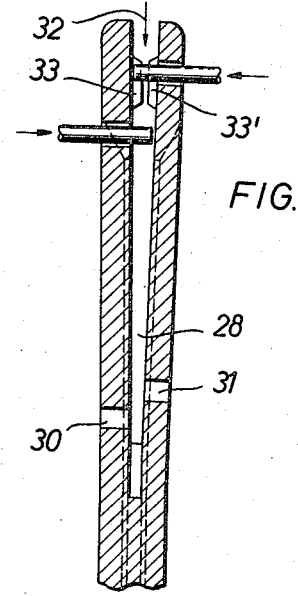
Figure 8:
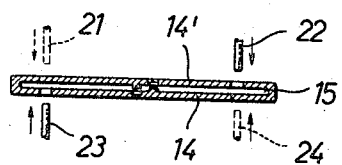
Figure 9:
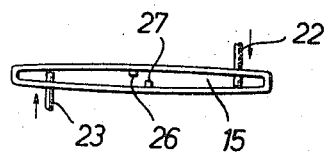
Figure 10:
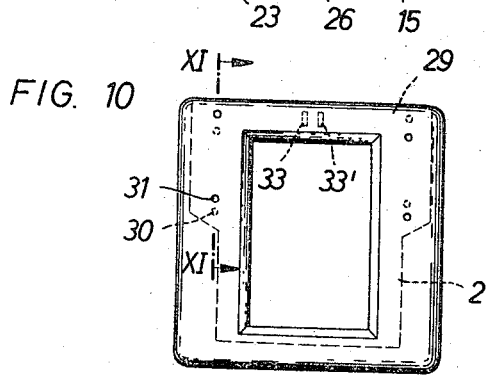
Figure 12:
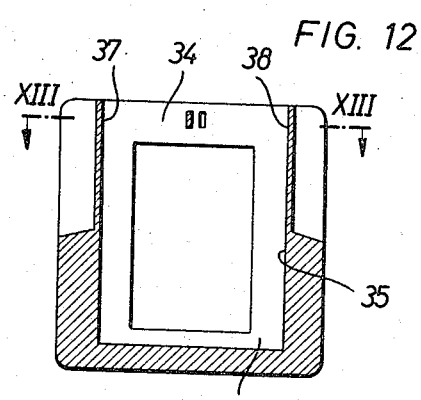
Figure 14:
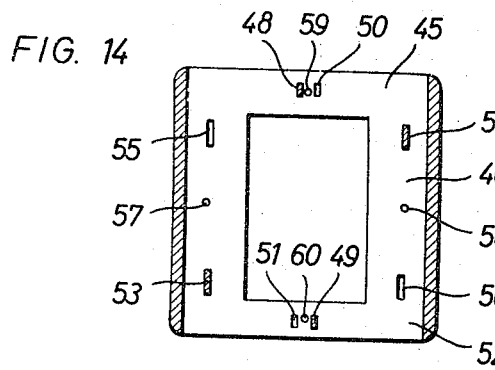
Figure 13:
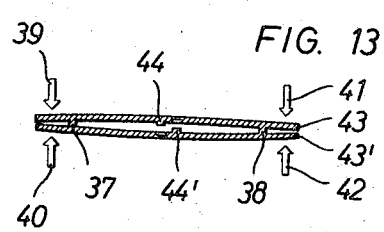
Figure 15:
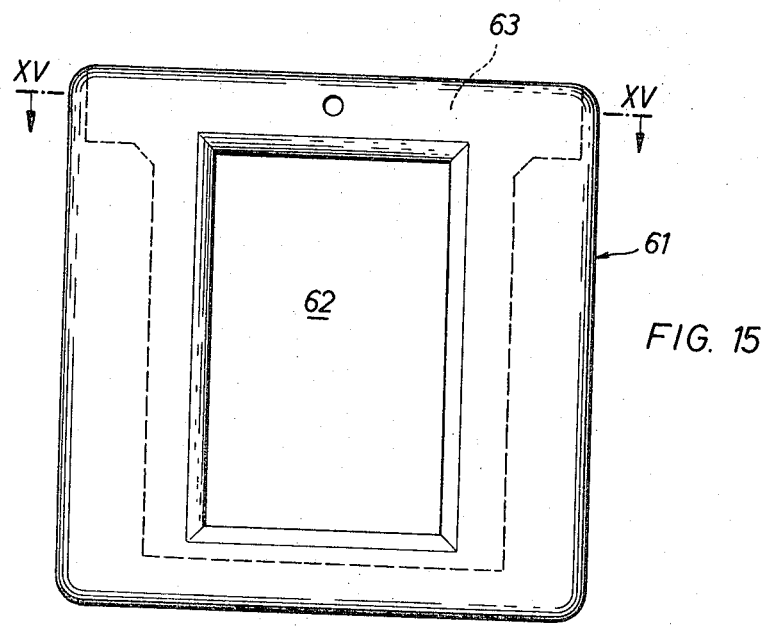
Figure 16:
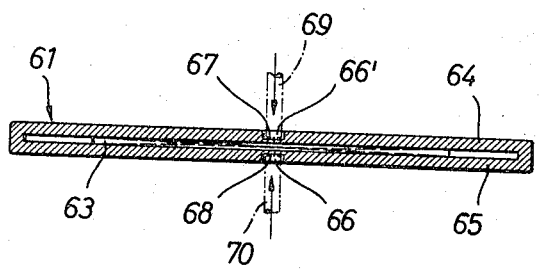
Figure 17:
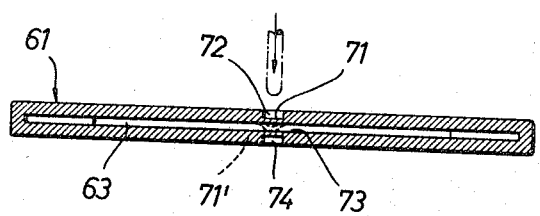
Figure 18:
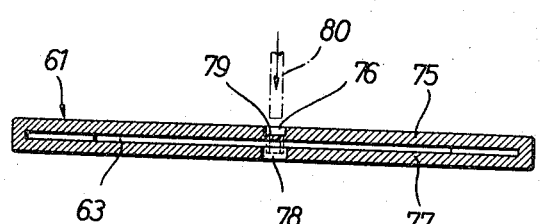

FIG. 1 is an elevation showing the frame according to the invention,

FIG. 2 is a transverse sectional view showing the frame as viewed in the direction of the arrow II in FIG. 1, FIG. 3 a sectional view of the frame, taken on line III—III of FIG. 2, FIG. 4 a view similar to FIG. 2 showing the spread-apart frame, FIG. 5 a sectional view showing the frame, taken on line V—V of FIG. 3, FIG. 6 a sectional view showing the frame, taken on line VI—VI of FIG. 3, FIG. 7 an elevation showing another embodiment of the frame according to the invention, FIG. 8 a sectional view showing the frame, taken on line VIII—VIII of FIG. 7, FIG. 9 a view similar to FIG. 8 showing the spread-apart frame, FIG. 10 an elevation showing a further embodiment of the frame according to the invention, FIG. 11 a sectional view showing the frame, taken on line XI—XI of FIG. 10, FIG. 12 a sectional view similar to FIG. 3 and showing an additional embodiment of a frame according to the invention, FIG. 13 a sectional view taken on line XIII—XIII of FIG. 12, FIG. 14 a sectional view similar to FIG. 3 and showing another embodiment of a frame according to the invention, FIG. 15 an elevation showing a still further embodiment of a transparency frame according to the invention, FIG. 16 a sectional view taken on line XV—XV in FIG. 15, FIG. 17 a sectional view taken on line XV—XV of FIG. 15 through another embodiment of the invention, and FIG. 18 a sectional view taken on line XV—XV in FIG. 15 through a still further embodiment of the invention.

In all embodiments which are shown, the transparency frame 1 consists of plastics material. It has the usual window 2 for viewing the picture area of the piece of film, a receiving pocket 3 surrounding the piece of film and holding the edges of the same, and on one side a slot 4, which extends entirely through the frame 1 and opens into the receiving pocket 3. As is best apparent from FIG. 3, each half 5 of the frame is provided adjacent to the receiving slot 4 with a limiting cam 6, for the inserted piece of film. Beside the limiting cam 6, each half of the frame has a correspondingly shaped groove 7. Thus, a limiting cam of one half of the frame registers with a groove in the other half of the frame, and a groove in one half of the frame registers with a limiting cam in the other half of the frame. As is best apparent from FIG. 3, the limiting cams 6 have on both sides inclined run-up surfaces 8, 9 in the direction in which the piece of film is inserted. The grooves 7 are also provided on both sides with inclined run-up surfaces 10, 11 in the direction in which the film is inserted. As is readily apparent from FIG. 6, the limiting cams and grooves are provided with oblique run-up surfaces on both sides. This design is essential for the invention because the limiting cams and grooves are shaped in practice with the aid of a laminated core, which could not be pulled out of the narrow receiving pocket 3 and the narrow receiving slot 4 unless the limiting cams and grooves had the described design.

In this connection, another design of the limiting cams and grooves is essential for the invention. This is best shown in FIG. 5. It has already been described that two limiting cams and grooves are alternately arranged in the two halves of the frame. FIG. 5 shows clearly that each limiting cam 6 is only slightly higher and each groove 7 is only slightly deeper than one half of the width of the reinforcing slot 4. The limiting cam 6 of the right-hand half of the frame is indicated in FIG. 5 by the dotted line on the limiting cam 6 of the left-hand half of the frame. It will be understood that the described design of the limiting cams and grooves prevents a falling of the piece of film out of the receiving slot 4 and that the height of the limiting cams is so small that the sheet core can be pulled out perfectly in spite of the narrow design of the receiving pocket 3 and the receiving slot 4.

In the embodiment shown in FIGS. 1 to 6, the receiving slot 4 opens into a sacklike receiving pocket 3 for the piece of film, as is readily apparent from FIG. 3. The receiving pocket is enlarged adjacent to the receiving slot 4, as is also apparent from FIG. 3. In this embodiment, the two halves of the frame can easily be spread apart by the exertion of oppositely directed pressures on the side edges of the transparency frame 1, as is indicated in FIG. 4 by the arrows 12, 13. The drawing shows further clearly that the spreading of the halves of the frame adjacent to the receiving slot moves the limiting cams 6, 6' sufficiently apart so that even during mechanical mounting a piece of film can be perfectly introduced through the receiving slot 4 into the receiving pocket 3. When the pressure on the side edges of the frame 1 is relaxed, the two halves 5 and 5' of the frame return to the position shown in FIG. 5 so that the piece of film is held against falling out of the transparency frame.

The frame thus described is injection-molded in all its parts in one operation as a one-part body of plastics material.

The same applies to the further embodiments which will be described hereinafter. With the exception of changes which are described, these frames have the same basic design as the embodiment described with reference to and shown in FIGS. 1 to 6.

The embodiment of a transparency frame according to the invention as shown in FIGS. 7 to 9 differs from the one described before by the special design of the two halves of the frame adjacent to the receiving slot so that they can be spread apart. Each half 14, 14' of the frame has two through bores 17, 18 or 19, 20 adjacent to the receiving slot 15, but outside the slideway for the piece of film to be inserted. This slideway is determined by the lateral boundary of the receiving pocket 16. These bores are arranged one below the other and relatively staggered. The bores 17 to 20 form passages for spreading mandrels 21 to 24, which are indicated in FIG. 8. As is best apparent from FIG. 9, each spreading mandrel 21-24 inserted through a bore 17-20 engages the inside surface of the other half 14 or 14' of the frame so that the two halves of the frame are spread apart adjacent to the receiving slot 15, as is apparent from FIG. 9. Thus, the piece of film can be inserted into the film slot 15 and into the receiving pocket without obstruction by the limiting cams 26, 27, even when the transparency is mounted by a machine.

FIGS. 10 and 11 of the drawing show a modification of the embodiment shown in FIGS. 7 to 9. This modification resides in that the receiving pocket 28 is widened from the middle of the frame to the length of the receiving slot 29. This enables the provision of additional bores 30, 31 forming passages for a spreading mandrel for engaging the other half of the frame. It will be appreciated that a frame thus designed can be spread more easily. The spreading mandrels inserted into the through bores serve in all cases also as lateral guide pins for the piece of film to be inserted. The spreading is particularly clearly apparent from the sectional view in FIG. 11. The arrow 32 indicates how the piece of film can be introduced into the receiving pocket 28, even by a machine, without obstruction by the limiting cams 33, 33'.

A third embodiment of the invention is shown in FIGS. 12 and 13. As is best apparent from FIG. 12, the receiving slot 34 extends in its upper portion throughout the width of the frame. In line with each lateral boundary 35 of the receiving pocket 36, a web 37, 38 is provided, which extends at right angles to the length of the receiving slot. When pressure is inserted in the two halves 43, 43' of the frame as indicated in FIG. 13 by the arrows 39-42, the webs 37, 38 provide for a lever action so that the receiving slot 37 is widened between these two webs. In this case too, the limiting cams 44, 44' cannot obstruct the introduction of the piece of film by a machine.

FIG. 14 of the drawing shows a further embodiment of the invention, which may be used as a modification of the embodiment of FIGS. 1 to 6, or of the embodiment of FIGS. 7 to 9. The receiving slot 45 merges without transition into a tubular receiving pocket 46 for the piece of film. In order to retain the piece of film in spite of the tubular form of the receiving pocket, limiting cams 48, 49 and grooves 50, 51 are provided at the top and bottom. The tubular form of the receiving pocket does not only provide one receiving slot 45 but provides at the opposite end another receiving slot 52. Limiting cams 53, 54 and grooves 55, 56 are provided for guiding the piece of film at the sides. These limiting cams and grooves are shaped as has been described with reference to FIGS. 5 and 6. Further guide means for the piece of film during its insertion are formed by bores 57, 58, through which pins of the mounting machine may be inserted as guide stops for the film picture.

As has already been stated, this frame may be spread apart in the manner which is apparent from FIG. 4 or from FIG. 9. In the latter case, bores corresponding to the bores 17 to 20 in FIG. 7 will have to be provided adjacent to one or both of the receiving slots, as will be understood. In order to prevent the piece of film inserted into the spread-apart frame from slipping through the tubular receiving pocket 46, additional bores 59 and 60 are provided adjacent to at least one receiving slot 45 or 52 between the limiting cam 48 and the groove 50 and between the groove 51 and the limiting cam 49. If the film picture is inserted through the receiving slot 45, a limiting pin is inserted in the mounting machine through the bore 60 and prevents the piece of film from leaving the frame at the opposite end even when the frame is spread apart. If the piece of film is inserted through the receiving slot 52, a corresponding pin is inserted through the bore 59. Owing to the tubular form of the receiving pocket, this embodiment of the frame according to the invention can be particularly easily spread apart.

In the embodiment shown in FIGS. 15 and 16, the transparency frame 61 has the usual window 62 for viewing the picture area of the transparency, a receiving pocket surrounding the transparency and holding the edges of the same, and on one side a slot 63 which opens into the receiving pocket and serves for receiving the transparency.

Each half 64, 65 of the frame has a central dead-ended hole 66, 66' adjacent to the receiving slot 63. On the mounting machine, the bottoms 67, 68 are welded together under the action of hot punches 69, 70 moving toward each other. In this way a slipping of the mounted transparency out of the receiving slot is effectively prevented. When leaving the mounting machine, the transparency frame according to the invention has the form indicated in dash-dot lines in FIG. 16.

That embodiment of the invention which is shown in FIG. 17 differs from the one just described only in that the bottom 71 of the dead-ended hole 72 has been engaged with the opposite wall portion 73 of the other half of the frame on the mounting machine by means of a warm or cold punch. In this case the bottom 71 assumes the position 71' shown in dotted lines in the drawing. It is obvious that the other half of the frame need not also be provided with a dead-ended bore 14 but this design has the advantage that it is not necessary to make sure in the mounting machine that the half of the frame which is opposite to the punch has a dead-ended hole. It will be understood that the described embodiment may be modified in that two deforming punches are provided on the mounting machine for shaping the bottoms of both dead-ended holes 72, 74 and engaging said bottoms with each other. This embodiment enables a ready replacement of the mounted transparency.

The embodiment of the invention shown in FIG. 18 differs from the embodiments described hereinbefore in that one half 75 of the frame is provided with a dead-ended hole 76 and the other half 77 of the frame is provided with a through bore 78. In the mounting machine, the bottom 79 of the dead-ended hole 76 is forced by a punch 80 into the bore 78 of the opposite half of the frame so that in this embodiment the transparency is locked against slipping out of the inserting slot.

From the description of the present invention it will be readily apparent to a person skilled in the art that the lock suggested according to the invention in the receiving slot to prevent an inadvertent slipping of the transparency out of the frame may be advantageously provided whether or not the two halves of the frame are designed to be spread apart adjacent to the receiving slot.

The object of the invention may also be accomplished by adhesively connecting the two halves of the frame in a preferably central portion of the receiving slot to prevent a slipping of the transparency out of the two halves of the frame.

What is claimed is:

1. A plastic transparency frame having a receiving pocket forming a slideway for said transparency, at least one window formed in said pocket, a receiving slot extending through one end of said frame and communicating with said pocket, and at least one bore formed through a portion of said pocket adjacent said slot and positioned outside of said slideway so as not to interfere with the passage of said transparency in and out of said pocket, said bore forming a passage for a sperading mandrel to be applied against the inside surface of an opposite portion of said pocket to enlarge said slot for the insertion of said transparency.

2. The frame of claim 1 wherein said pocket is sack-like.

3. The frame of claim 1 wherein said pocket is tubular.

4. The frame of claim 1 wherein said receiving pocket is wider adjacent the receiving slot.

5. The frame of claim 1 wherein there are at least two additional through bores formed in said pocket, said additional bores forming a passage for a spreading mandrel to be applied against the inside surface of said pocket to enlarge said slot for the insertion of said transparency, all of said bores being arranged so that their corresponding mandrels serve as lateral guides for said transparency.

6. A plastic transparency frame as defined in claim 1 including a frusto conical cam formed on the inside surface of one portion of said pocket adjacent said receiving slot to retain said transparency in said frame.

7. The frame of claim 6 further comprising a groove formed on the inside surface of an opposite portion of said pocket, said groove being of a shape corresponding to said cam.

8. The frame of claim 7 further comprising at least one additional cam and at least one additional groove provided on opposite portions of said frame, each portion of said frame being provided with at least one cam and at least one groove.

9. The frame of claim 8 characterized in that each of said cams is slightly higher and each groove slightly deeper than one-half the width of the receiving slot.

10. A plastic transparency frame having a tubular receiving pocket extending for substantially the entire length of said frame, and forming a slideway for said transparency, at least one window formed in said pocket, a receiving slot formed in each end of said frame in communication with said pocket, and retaining means located at each end of said pocket for retaining said transparency in said frame.

11. The frame of claim 10 wherein each of said retaining means comprises at least one cam formed on said pocket.

12. The frame of claim 10 further comprising means to guide said transparency along said slideway.

13. The frame of claim 10 further comprising a through bore formed in at least one side of said pocket adjacent said slot and forming a passage for a mandrel to be applied adjacent the inside surface of the opposite side of said pocket to provide a stop for said transparency.

14. A plastic transparency frame having a receiving pocket forming a slideway for said transparency, a window formed in each side of said pocket, and a through bore formed in at least one side of said pocket, positioned outside of said slideway so as not to interfere with the passage of said transparency in and out of said pocket and forming a passage for a spreading mandrel to be applied against the inside surface of the other side of said pocket to form an enlarged lateral receiving slot communicating with said pocket.

15. A plastic transparency frame comprising two complementary portions defining between them a receiving pocket forming a slideway for said transparency, at least one window formed in said pocket, a receiving slot extending through one end of said frame and communicating with said pocket, said receiving slot being defined by two webs disposed between said complementary portions at right angles to said complementary portions and laterally spaced from the ends of said complementary portions, a frusto conical cam formed on the inside surface of one portion of said pocket adjacent said receiving slot to retain said transparency in said frame.

16. The frame of claim 15 further comprising a groove formed by the inside surface of an oppoiste portion of said pocket, said groove being of a shape corresponding to said cam.

17. The frame of claim 16 further comprising at least one additional cam and at least one additional groove provided on opposite portions of said frame, each portion of said frame being provided with at least one cam and at least one groove.

18. The frame of claim 17 characterized in that each of said cams is slightly higher and each groove slightly deeper than one-half the width of the receiving slot.

19. A plastic transparency frame having a receiving pocket forming a slideway for said transparency, at least one window formed in said pocket, and a receiving slot extending through one end of said frame and communicating with said pocket, one portion of said pocket adjacent said slot being deformed into engagement with an opposite portion thereof to retain said transparency in said frame, said pocket having a dead end bore formed therein, the bottom of which forms said deformed position.

20. The frame of claim 19 wherein said opposite portion is in the form of a bore for receiving said deformed portion of said dead end bore.

21. A plastic transparency frame having a receiving pocket forming a slideway for said transparency, at least one window formed in said pocket, and a receiving slot extending through one end of said frame and communicating with said pocket, one portion of said pocket adjacent said slot being deformed into engagement with an opposite portion thereof to retain said transparency in said frame, at least one of said engaging portions being in the form of a dead end bore, the bottom of which is welded to the other portion.

References Cited
UNITED STATES PATENTS

| | | | |
|---|---|---|---|
| 654,147 | 7/1900 | Carraine | 40—159 |
| 2,390,053 | 12/1945 | Bradford | 40—152 |
| 2,532,776 | 12/1950 | Linser | 40—152 |
| 2,535,265 | 12/1950 | Caffrey | 40—159 X |
| 3,035,364 | 5/1962 | Hoogesteger | 40—152 |

FOREIGN PATENTS

| | | |
|---|---|---|
| 1,162,510 | 4/1958 | France. |
| 1,311,727 | 1/1962 | France. |
| 1,109,408 | 6/1961 | Germany. |

LAWRENCE CHARLES, *Primary Examiner.*

EUGENE R. CAPOZIO, *Examiner.*

W. J. CONTRERAS, *Assistant Examiner.*